(12) United States Patent
Way et al.

(10) Patent No.: US 6,525,857 B1
(45) Date of Patent: Feb. 25, 2003

(54) METHOD AND APPARATUS FOR INTERLEAVED OPTICAL SINGLE SIDEBAND MODULATION

(75) Inventors: Winston I. Way, Hsingchu (TW); Ming Chia Wu, Hsingchu (TW); Ming-Bing Chen, Hsingchu (TW)

(73) Assignee: Opvista, Inc., Irvine, CA (US)

( * ) Notice: Subject to any disclaimer, the term of this patent is extended or adjusted under 35 U.S.C. 154(b) by 0 days.

(21) Appl. No.: 09/575,811

(22) Filed: May 22, 2000

Related U.S. Application Data
(60) Provisional application No. 60/187,383, filed on Mar. 7, 2000.

(51) Int. Cl.$^7$ .............................................. H04B 10/04
(52) U.S. Cl. ........................ 359/183; 359/188; 359/181; 359/132; 359/115
(58) Field of Search ................................ 359/181, 183, 359/115, 188, 132; 455/45, 47

(56) References Cited

U.S. PATENT DOCUMENTS

| | | | |
|---|---|---|---|
| 5,301,058 A | 4/1994 | Olshansky | 359/188 |
| 5,333,000 A | 7/1994 | Hietala et al. | 342/368 |
| 5,596,436 A | 1/1997 | Sargis et al. | 359/132 |
| 5,745,273 A | 4/1998 | Jopson | 359/181 |
| 5,880,570 A | * 3/1999 | Sieben et al. | 359/181 |
| 5,949,273 A | 9/1999 | Roberts et al. | 359/110 |
| 5,982,963 A | 11/1999 | Feng et al. | 385/37 |
| 6,008,931 A | 12/1999 | von Helmolt et al. | 359/326 |
| 6,118,566 A | 9/2000 | Price | 359/181 |
| 6,130,766 A | 10/2000 | Cao | 359/161 |
| 6,163,553 A | 12/2000 | Pfeiffer | 372/6 |

OTHER PUBLICATIONS

S. Walklin, "Multilevel Signaling For Increasing The Reach Of 10 Gb/s Lightwave Systems" *Journal of Lightwave Technology*, vol. 17, No. 11, Nov. 1999.
M. Sieben, "Optical Single Sideband Transmission At 10 Gb/s Using Only Electrical Dispersion Compensation" Journal of Lightwave Technology, vol. 17, No. 10, Oct. 1999.
W. Way, "Subcarrier Multiplexed Lightwave System Design Considerations For Subscriber Loop Applications" *Journal of Lightwave Technology*, vol. 7, No. 11, Nov. 1989.
M.M. Ohn, "Dispersion Variable Fibre Bragg Grating Using A Piezoelectric Stack" *Electronic Letters*, vol. 32, No. 21, Oct. 1996.
K. Yonenaga, "Optical Duobinary Transmission System With No Receiver Sensitivity Degradation" *Electronic Letters*, vol. 21, No. 4, Feb. 1995.
K. Kitayama, "Highly Spectrum Efficient OFDM/PDM Wireless Networks Using Optical SSB Modulation", *Journal of Lightwave Technology*, vol. 16, No. 6, Jun. 1998.

(List continued on next page.)

*Primary Examiner*—Leslie Pascal
*Assistant Examiner*—Christina Y Leung
(74) *Attorney, Agent, or Firm*—Paul Davis; Heller Ehrman White & McAuliffe

(57) ABSTRACT

A method and device for bandwidth efficient multi-channel optical single sideband modulation with suppressed carrier and a corresponding method and apparatus for demodulation are disclosed. The modulator includes a bandwidth efficient coder/modulator, a Microwave/millimeter-wave upconverter and an OSSB modulator, an optical notch filter and a chirped fiber grating. The demodulator uses at least one narrowband optical bandpass filters in combination with at least one baseband optical receiver to recover the transmitted baseband digital signals. The modulation method and device are suitable for short or long-distance optical fiber transmission systems.

15 Claims, 12 Drawing Sheets

OTHER PUBLICATIONS

Way, "Broadband Hybrod Fiber Coax Access System Technologies", New York, Academic Press 1998, pp. 253–300.

Smith et al., Broad–band Millimeter–Wave (38 GHz) Fiber–Wireless Transmission System Using Electrical and Optical SSB Modulation to Overcome Dispersion Effects, IEEE Photonics Technology Letters, vol. 10, No. 1, Jan. 1998, pp. 141–144.

Wu et al., "CSO Distortions Due to the Combined Effects of Self– and External–Phase Modulations in Long–Distance 1550–nm AM–CATV Systems", IEEE Photonics Technology Letters, vol. 11, No. 6, Jun. 1999, pp. 718–721.

Ramos et al., "Comparison of Optical Single–Sideband Modulation and Chirped Fiber Gratings as Dispersion Mitigating Techniques in Optical Millimeter–Wave Multichannel Systems", IEEE Photonics Technology Letters, vol. 11, No. 11, Nov. 1999, pp. 1479–1482.

Way, "Subcarrier Multiplexed Lightwave System Design Considerations For Subscriber Loop Applications", Journal of Lightwave Technology, vol. 7, No. 11, Nov. 1989, pp. 1806–1819.

Yonenaga et al., "Dispersion–Tolerant Optical Transmission System Using Duobinary Transmitter and Binary Receiver", Journal of Lightwave Technology, vol. 15, No. 8, Aug. 1997, pp. 1530–1538.

* cited by examiner

METHOD AND APPARATUS FOR INTERLEAVED OPTICAL SINGLE SIDEBAND MODULATION

This application claims priority from U.S. Provisional patent application No. Ser. No. 60/187,383 filed on Mar. 7, 2000 which is herein incorporated by reference.

BACKGROUND OF THE INVENTION

1. Field of the Invention

The present invention relates generally to a method and apparatus for modulation of broadband optical signals. More particularly, the present invention relates to an interleaved single sideband modulation technique.

2. Description of Related Art and General Background

Conventional optical fiber transmission systems, such as optical fiber community access television ("CATV") transmission systems can carry multiple channels on a single optical fiber communication line. The channels are transmitted modulated on a wideband signal made up of a plurality of frequency division multiplexed carriers. A wideband optical detector or photo-receiver receives the wideband signal. Each individual channel can be recovered by a heterodyne tuner along with an appropriate microwave filter. An optical fiber transmission system using this type of modulation technique can transmit analog or digital signals and is known as a sub-carrier multiplexed ("SCM") optical transmission system. FIG. 1 shows a schematic diagram of a typical SCM system which is described in detail in W. I. Way, Subcarrier Multiplexed Lightwave Systems for Subscriber Loop Applications, Journal of Lightwave Technology, 1988, pp. 1806–1818.

High spectral efficiency digital modems may be used to greatly increase the spectral efficiency of conventional SCM techniques. For example, an optical transmitter with a 1 GHz bandwidth can transmit 100 sub-carrier 6 MHz 64-QAM (quadrature amplitude modulation) channels. Since each channel can carry 30 Mb/s of data, 4.98 Gb/s of data may be transmitted, which gives a spectral efficiency of approximately 5 bits/sec/Hz. In comparison, the same transmitter can transmit only 1.4 Gb/s of on-off keying data for a spectral efficiency of only about 1.4 bits/sec/Hz.

There are two important problems to overcome when using a broadband optical transmitter to transport a large quantity of digital data using SCM technology. The first is that the receiver must be a very wideband photoreceiver, which tend to have high spectral noise density and require a complicated and expensive heterodyne receiver. The second is that SCM is an optical double-sideband modulation (ODSB) technique, as shown in FIG. 2A. This means that half of the bandwidth is wasted, as each of the upper and lower sidebands are carrying the same information. One solution to this problem, as shown in Olshansky (U.S. Pat. No. 5,301,058), is to eliminate the lower side band to produce an optical single-sideband signal (OSSB) as shown in FIG. 2B. One may then combine many OSSB modulators, using multiple carrier signals, to more efficiently use the available optical fiber transmission spectrum. This is illustrated in FIG. 2C. This is known as OSSB-DWDM, or optical single side band, dense wavelength division multiplexing. Using double OSSB (D-OSSB), the upper and lower sidebands carry different signals, as shown in FIG. 2D. Thus, the required number of carriers is only half of that required by the OSSB modulation shown in FIG. 2C.

When amplifying the transmitted signal in a conventional multiplexing method, the carrier signal is likewise amplified. Amplification of the carrier signal represents a waste of amplifier gain, since gain is used to amplify a signal that carries no information. Moreover, as power density in the transmission fiber is increased, signal losses due to nonlinear effects are also increased. Elimination of the carrier signal can significantly decrease the total signal power, thereby reducing the total power density and nonlinear effects.

One method for suppressing the carrier signal is disclosed by Jopson (U.S. Pat. No. 5,745,273). Jopson makes use of a dual path modulator arranged in an optical loop. The light is divided by a coupler which provides a portion of the signal to an optical fiber traveling in each direction around the loop. The signal in one direction is modulated to create a carrier and sidebands while the other is solely the carrier. Upon recombining the two optical signals in a combiner, a signal is produced in which the two carrier signals cancel each other and leave only the modulated signal. One drawback of the Jopson arrangement is the requirement of extremely strict tolerances with respect to the lengths of the paths of the loop so that the two signals will arrive at the combiner having the carrier signals exactly out of phase. This requirement makes the Jopson device difficult to implement in practice.

Even these solutions are imperfect. Use of an OSSB supressed carrier (OSSB-SC) modulation method, when applied to multi-channel, long-distance optical fiber transmission systems, presents three additional problems. First, conventional narrowband optical filters have a slow roll-off which makes it likely that an optical filter used in the receiver will allow portions of adjacent channels to enter into the filtered window, producing noise in the signal, as illustrated in FIGS. 3A and 3B. Second, as illustrated in FIG. 3B, residual images are produced due to imperfections in the 90° phase shift of the high frequency electrical modulating signal or in the phase shift of the optical signal between the arms of the Mach-Zehnder modulator. Third, dispersion causes self- and external phase modulations which tend to produce distortions in signals transmitted over long distances at 1550 nm, due to beating among the several optical channels. This last problem may be reduced by the use of dispersion reduction techniques such as use of a chirped fiber grating or dispersion compensating fibers.

SUMMARY OF THE INVENTION

The present invention addresses the needs identified above by providing an interleaved optical single sideband communications system including a modulator, constructed and arranged to accept an incoming optical carrier. The modulator includes a splitter which splits the incoming optical signal into a first optical carrier and a second optical carrier. The modulator also includes a first AC phase modulator to apply a first electrical signal carrying a plurality of first channels to modulate the first optical signal and a second AC phase modulator to apply a second electrical signal carrying a plurality of second channels to modulate the second optical signal, each first channel corresponding to one of the second channels, and each first channel being phase shifted 90° relative to each corresponding second channel. Additionally, the modulator includes a first DC phase modulator to modulate the first optical signal and a second DC phase modulator to modulate the second optical signal. The first and second DC phase modulators are constructed and arranged to modulate an optical carrier component of the first optical signal to be phase shifted 90° relative to a corresponding optical carrier component of the second optical signal. The modulator also includes a combiner which combines the modulated first and second optical signals to form a combined optical signal having an optical carrier component, such that alternate channels of the combined optical signal are substantially cancelled to produce an interleaved, optical single-sideband signal which reduces both adjacent channel interference and residual image problems as discussed above in relation to conventional techniques. An example of a spectrum for an I-OSSB transmission is illustrated in FIG. 3C.

BRIEF DESCRIPTION OF THE DRAWINGS

The accompanying drawings, which are incorporated in an constitute a part of this specification illustrate an embodiment of the invention and together with the description, explains the objects, advantages, and principles of the invention.

DETAILED DESCRIPTION OF THE PREFERRED EMBODIMENTS

In the following description, for purposes of explanation and not limitation, specific details are set forth such as particular optical and electrical circuits, circuit components, techniques, etc. in order to provide a thorough understanding of the present invention. However, the invention may be practiced in other embodiments that depart from these specific details. In some instances, detailed descriptions of well-known devices and circuits may be omitted so as not to obscure the description of the present invention with unnecessary details.

Figure 1:
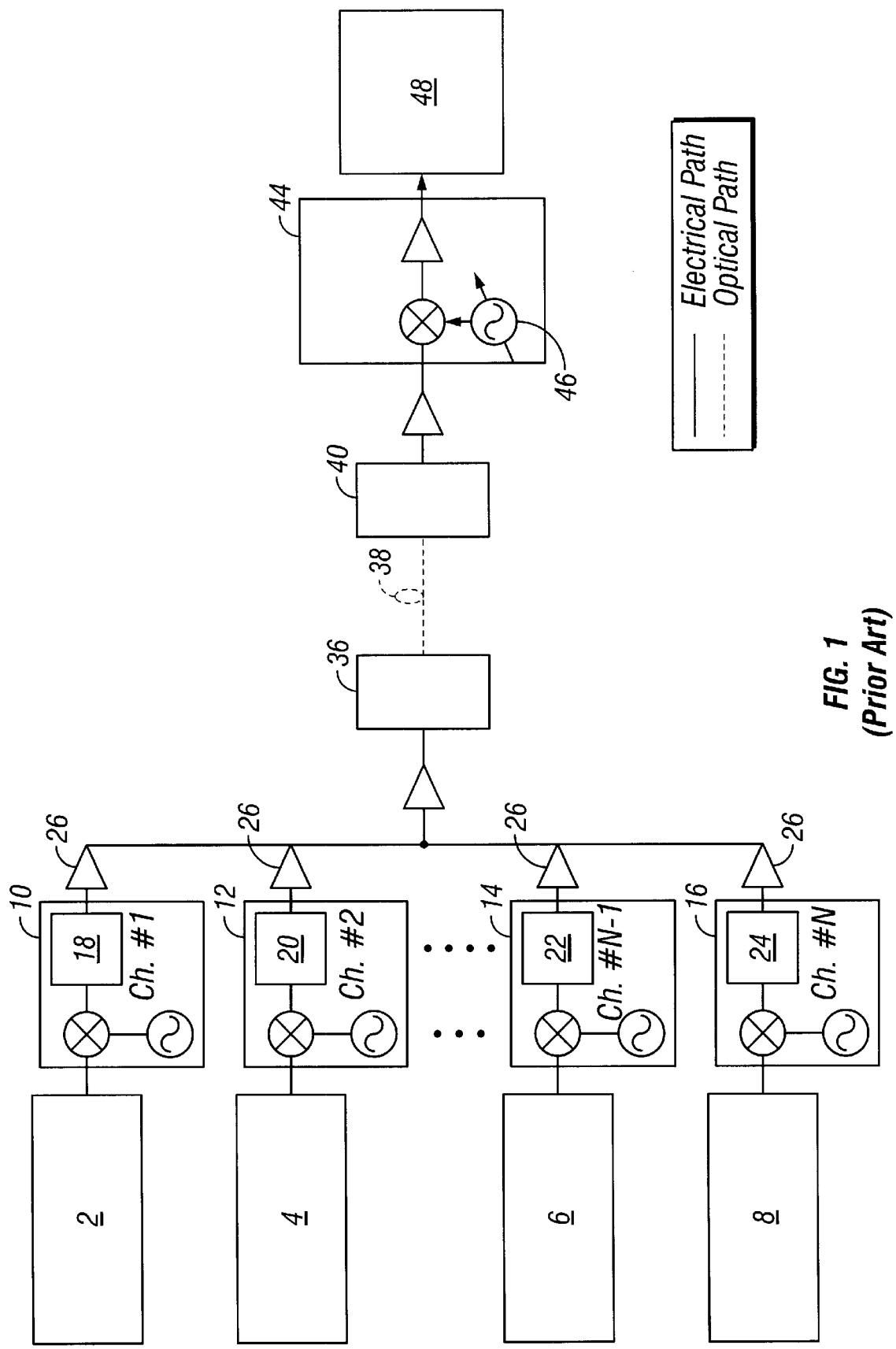
FIG. 1 is a schematic diagram of a conventional subcarrier multiplexed lightwave system.
Figure 2A:
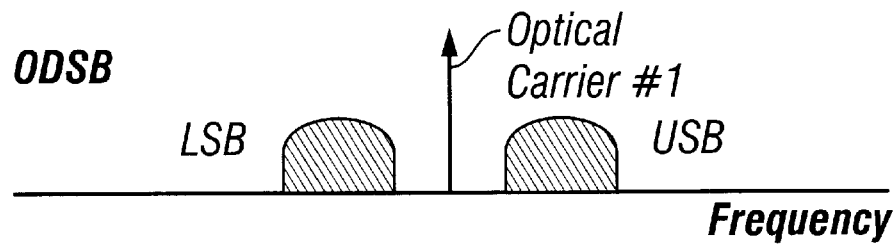
FIGS. 2A through 2D are spectral diagrams comparing spectral efficiency of various modulation techniques.
Figure 2B:
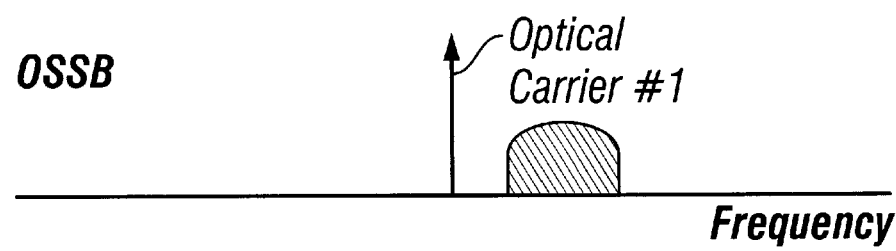
Figure 2C:
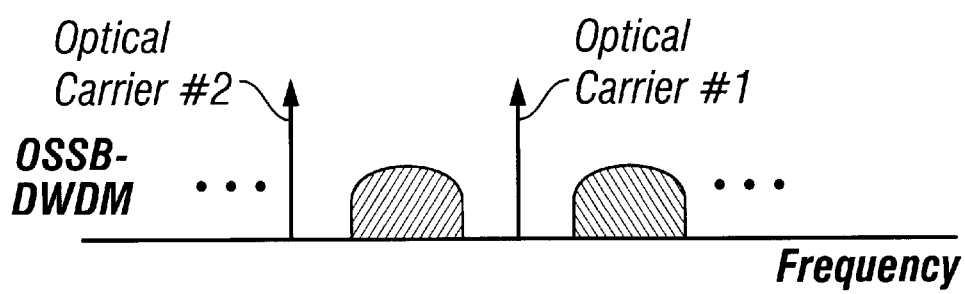
Figure 2D:
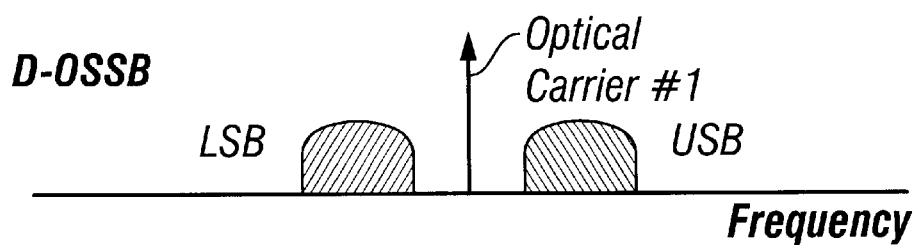

Referring now to FIG. 1, a conventional subcarrier multiplexing transmitter and receiver pair are shown. A plurality of modulators 2, 4, 6, 8, which may be analog, digital or any combination thereof, produce signals corresponding to a plurality of channels. Each channel is frequency division multiplexed by using local oscillators 10, 12, 14, 16 of different radio frequencies, known as subcarriers. The signal for each channel is processed by a band pass filter (not shown) to attenuate components of the signal which are outside of the channel (e.g. harmonics). The several channels are amplified by an amplifier 26 and combined, and the combined signal is amplified once more and used to drive a light emitting device which is conventionally a directly or externally modulated laser diode acting as part of an optical transmitter 36. Preferably the light emitting device has a fast response time and can produce a narrow linewidth with good coherence.

The combined signal is transmitted through an optical fiber 38 to a broadband optical receiver 40. The optical fiber 38 is preferably single mode fiber to reduce modal dispersion and other modal noise problems. It may alternately be a conventional single mode fiber having zero dispersion at 1310 nm or any other single mode fiber. For wavelength division multiplexing applications, or other broadband applications, the dispersion slope is also preferably small. The signal proceeds to a heterodyne tuner which typically includes a tunable local oscillator 46 which is used to selectively tune to one of the channels which may then be demodulated with an appropriate analog or digital demodulator. Preferably, a band pass filter (not shown) may be included in the receiver to better select the desired channel and exclude noise from neighboring channels.

Figure 4A:
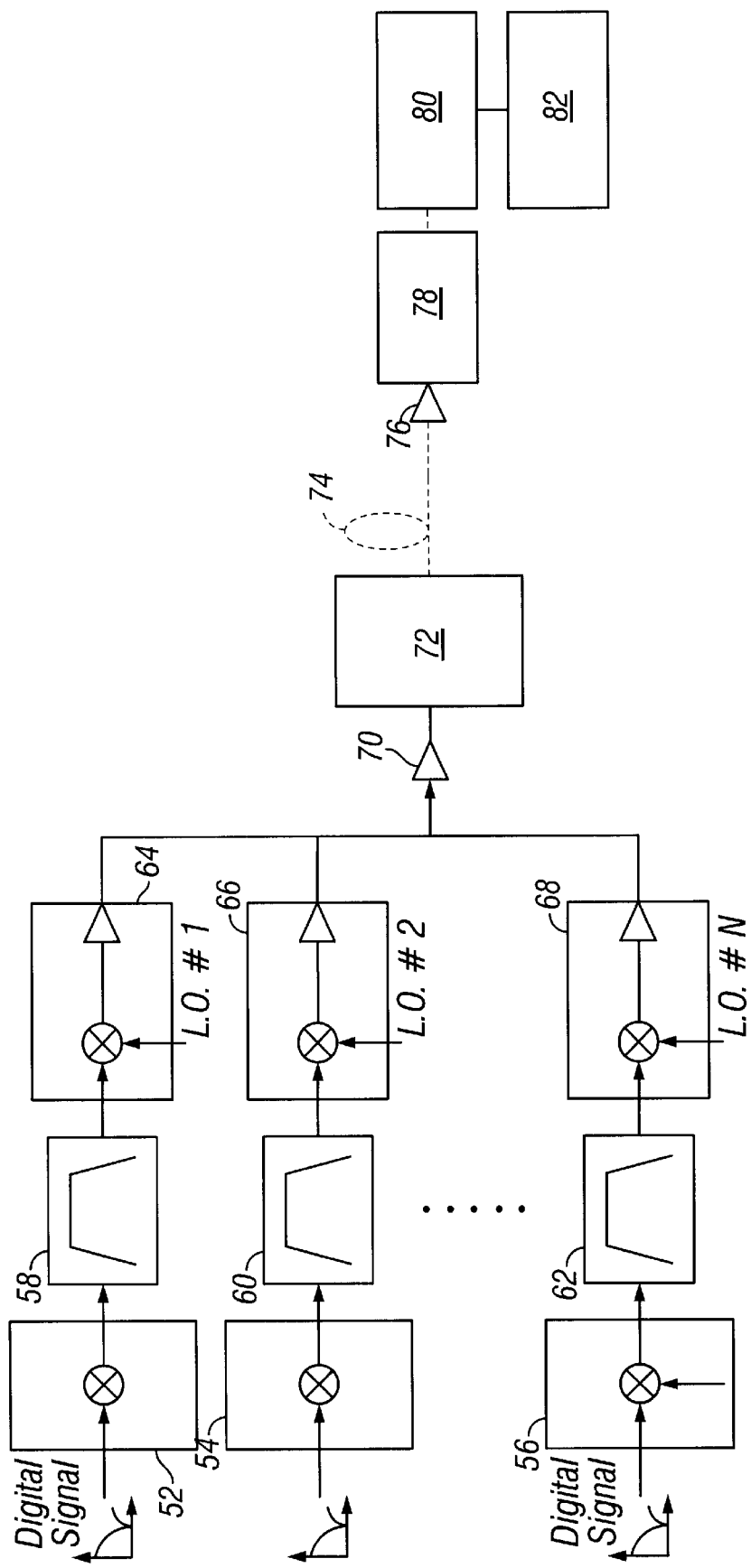
FIG. 4A is a schematic diagram of an optical frequency division multiplexed lightwave system according to the present invention.

FIG. 4A shows a multiple channel transmission system consistent with an aspect of the present invention. Baseband signals are modulated by a plurality of modulators 52, 54, 56. The modulators may be, for example, a simple modulator such as an amplitude shifted keying (ASK) modulator, a frequency shifted keying (FSK) modulator, a differential phase shift keying (DPSK) modulator, a differential quadrature phase shift keying (DQPSK) modulator, or a duobinary modulator.

The modulated signals are each passed through an intermediate frequency band pass filter 58, 60, 62, then modulated using a plurality of upconverters including local oscillators 64, 66, 68. The channels are combined, amplified and passed through an amplifier 70 to an optical transmitter 72 which may be optical transmitter 36 described above with respect to FIG. 1. Optionally, the transmitter 72 may include an erbium-doped fiber amplifier (EDFA, not shown) to increase the signal strength. The combined optical signal passes through a length of optical fiber 74, which is preferably single mode optical fiber. It is optionally pre-amplified with an optical amplifier 76, which is preferably an EDFA. A tunable channel optical filter 78 selects a particular channel which is then received by a baseband optical receiver 80. The optical filter 78 also helps to reduce spontaneous emission noise produced by the EDFA pre-amplification process. The baseband optical receiver 80 produces an electrical signal which is demodulated by a demodulator 82.

Figure 4B:
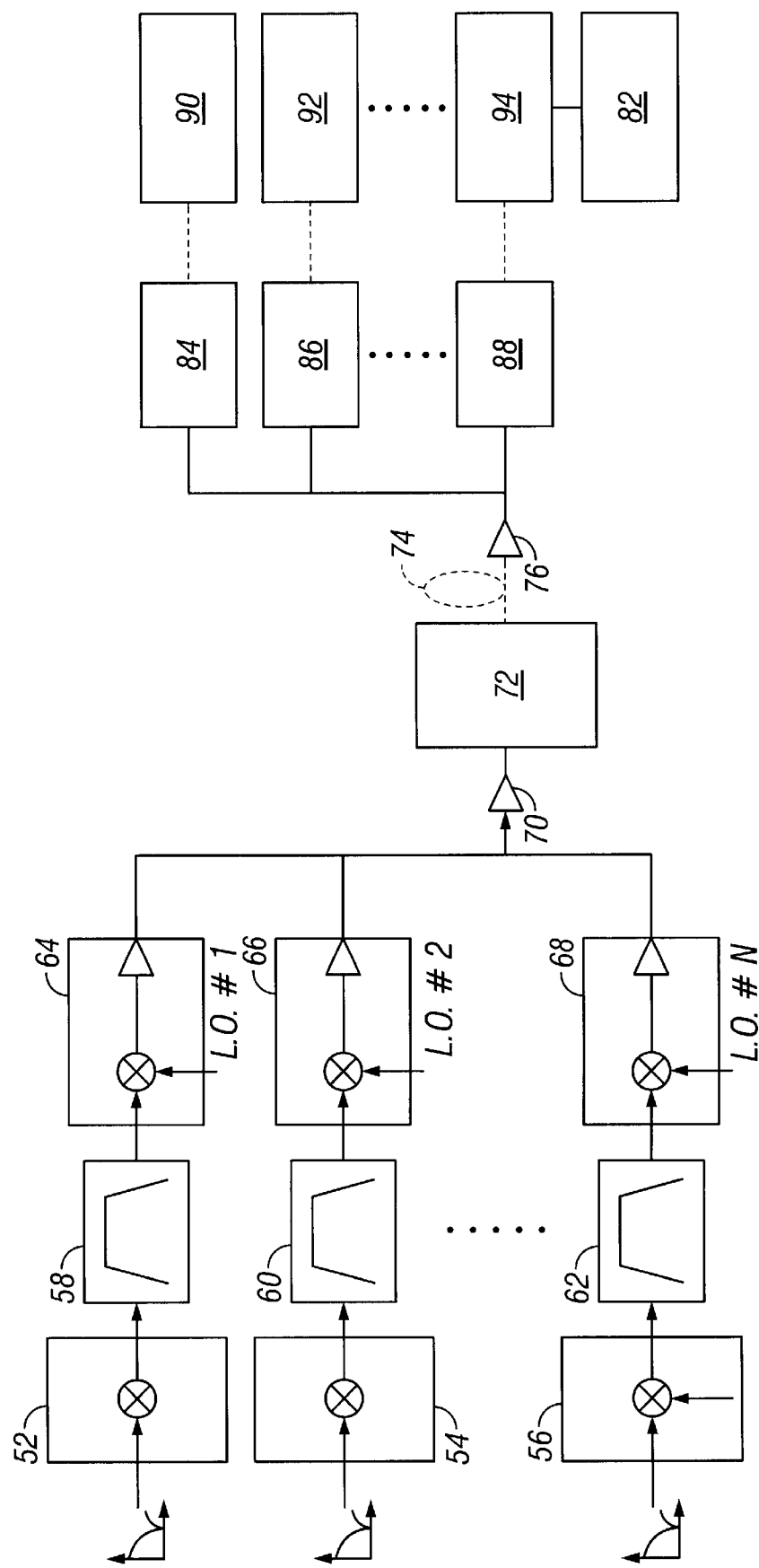
FIG. 4B is a schematic diagram of an optical frequency division multiplexed lightwave system having an array of optical filters according to the present invention.

A second embodiment of a transmission system is shown in FIG. 4B. The system shown in FIG. 4B is similar to the system of FIG. 4A. However, the single tunable optical filter 78 is replaced by a plurality of optical filters 84, 86, 88 each of which is preferably a fixed filter, although each may also be tuneable filters adapted to pass only a single selected channel. Each channel signal proceeds to a baseband optical receiver 90, 92, 94 which in turn, passes the resulting electrical signal to a demodulator 82.

Where tuneable filters are used, they preferably include a feedback circuit to ensure that the filter passband always locks on to the center of the desired channel, despite any wavelength drift of the laser diode. This provides an advantage over conventional DWDM systems in which all optical transmitters require a stringent wavelength locker.

Figure 4C:
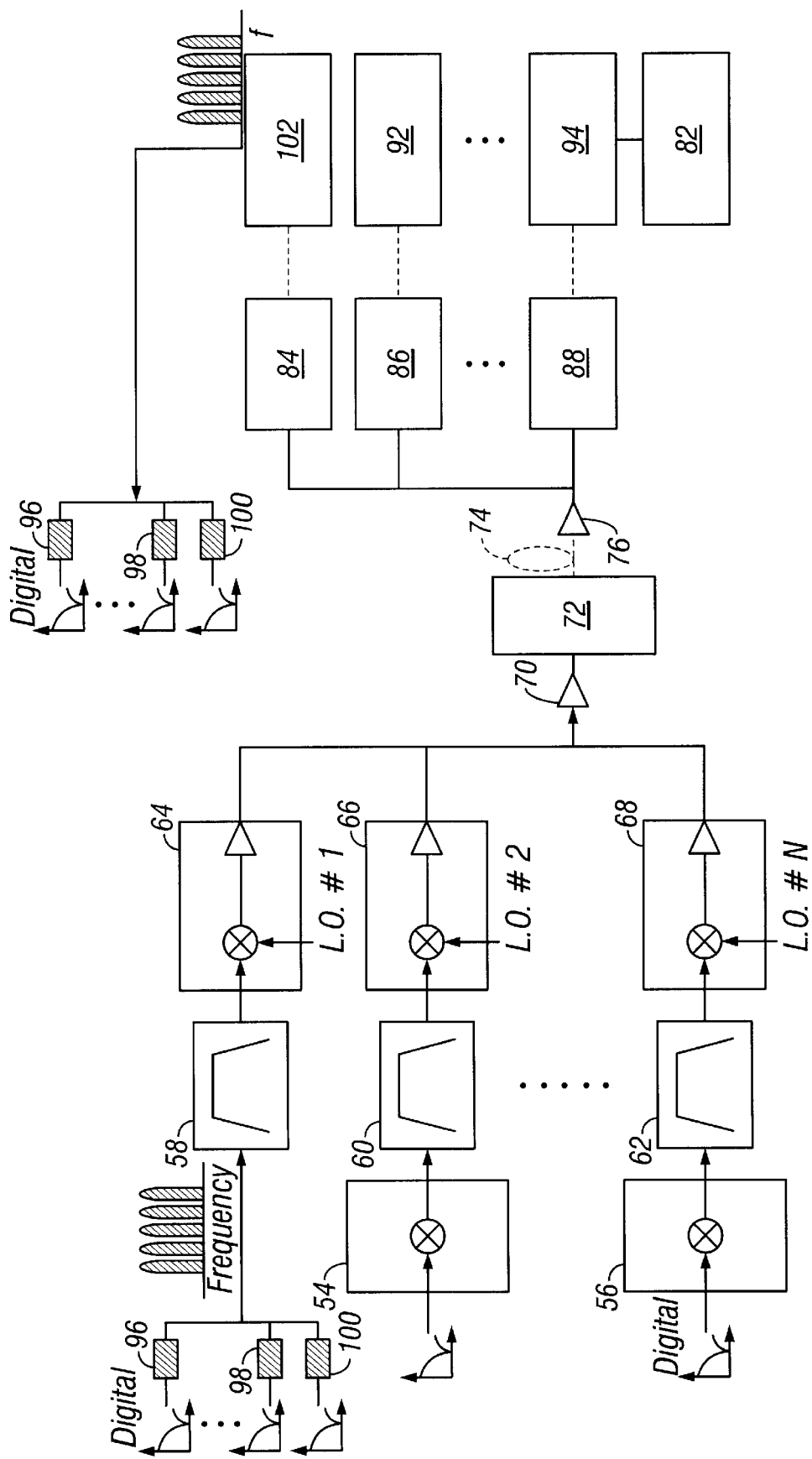
FIG. 4C is a schematic diagram of an optical frequency division multiplexed lightwave system including a broadband optical receiver according to the present invention.

Another alternate arrangement of the transmission system is shown in FIG. 4C. In this embodiment, one of the channels carries a plurality of low bit-rate channels 96, 98, 100. The plurality of low bit-rate subcarrier channels 96, 98, 100 are multiplexed onto a single band having a bandwidth which is preferably of a similar size to each of the high bit-rate channels, though this is not necessary. Other components of the device are similar to those shown in FIGS. 4A and 4B, with the exception of the receivers. For each channel which contains low bit-rate subcarrier channels, the baseband optical receiver 90 is replaced with a broadband optical receiver 102. The broadband optical receiver 102 provides the sub-channel signals to demodulators (not shown) which are then used to extract each of the individual sub-channels.

The plurality of low bit-rate channels shown in FIG. 4C can preferably use spectrally efficient modems (96, 98, 100) such as M-ary quadrature amplitude modulated (QAM) modems, quadrature phase shifted keying (QPSK) modems, orthogonal frequency division multiplexing (OFDM) modems or M-ary vestigial sideband (VSB) modems. One skilled in the art will recognize that other spectrally efficient modems may be employed.

Figure 5A:
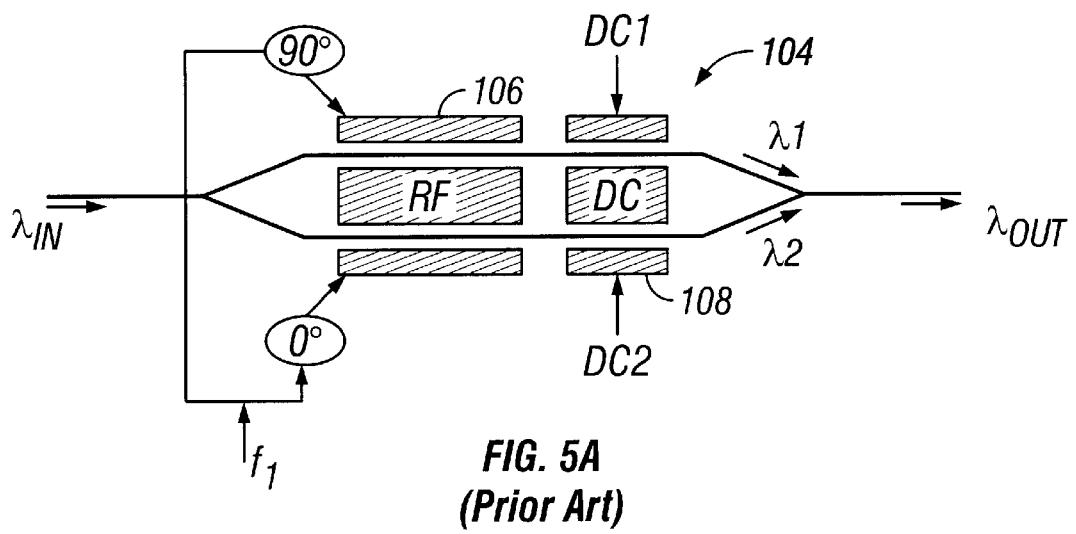
FIG. 5A is a schematic diagram of a prior art dual electrode Mach-Zehnder modulator.

To better understand the present invention, it is useful to discuss OSSB and D-OSSB transmission. In an OSSB system carrying one channel, the channel is modulated onto the optical carrier signal with a modulator shown in detail in FIGS. 5A and 5B. A dual electrode Mach-Zehnder modulator, indicated generally at 104, forms the basis of the system. An incoming light signal $\lambda_{IN}$ is split into a first optical signal $\lambda_1$ and a second optical signal $\lambda_2$. An RF alternating current electrode 106 modulates the two optical signals with the channel signal to be transmitted (i.e. $f_1$), however, $f_1$ is applied to the carrier such that the signal applied to the upper arm of the modulator is phase-shifted 90° with respect to the signal applied to the lower arm. Subsequently, a DC electrode 108 further modulates the carriers such that the two arms are also shifted 90° with respect to each other. That is, the carriers of the two arms are in quadrature with each other. The two signals are then combined to produce an output signal $\lambda_{out}$ in which only the carrier and the lower side band are present. This process may be easily modified so that the lower side band is cancelled and the upper side band is transmitted.

Figure 5B:
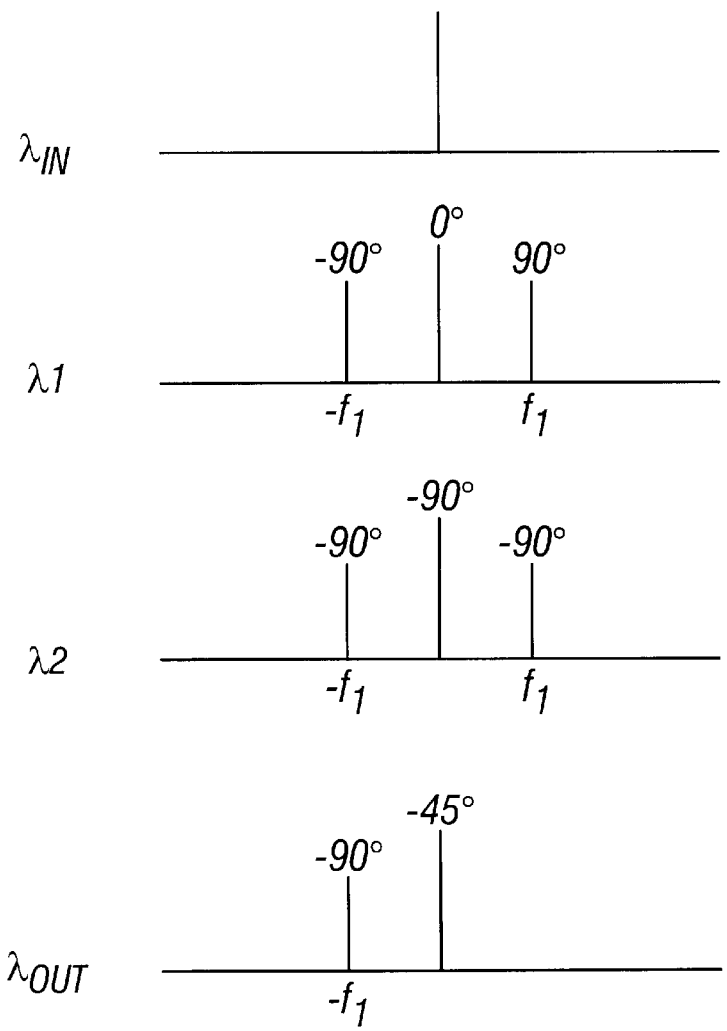
FIG. 5B is a spectral diagram showing input and output of the modulator shown in FIG. 5A.

Referring now to FIG. 5B, spectra of the signals at various stages are shown. Initially, $\lambda_{IN}$ includes only the carrier. After both the AC and DC electrodes 106, 108 have applied an electric field to the carrier signal in the upper arm, $\lambda_1$ has an upper and a lower side band, the upper side band at 90° and the lower side band at −90°, along with the carrier at 0°. Likewise, after passing through both electric fields, the lower arm signal 2 has a carrier at −90°, an upper side band at −90° and a lower side band at −90°. When the two signals $\lambda_1$ and $\lambda_2$ are combined to form $\lambda_{OUT}$ the two upper side bands cancel each other, leaving only the lower side band and the carrier.

Figure 5C:
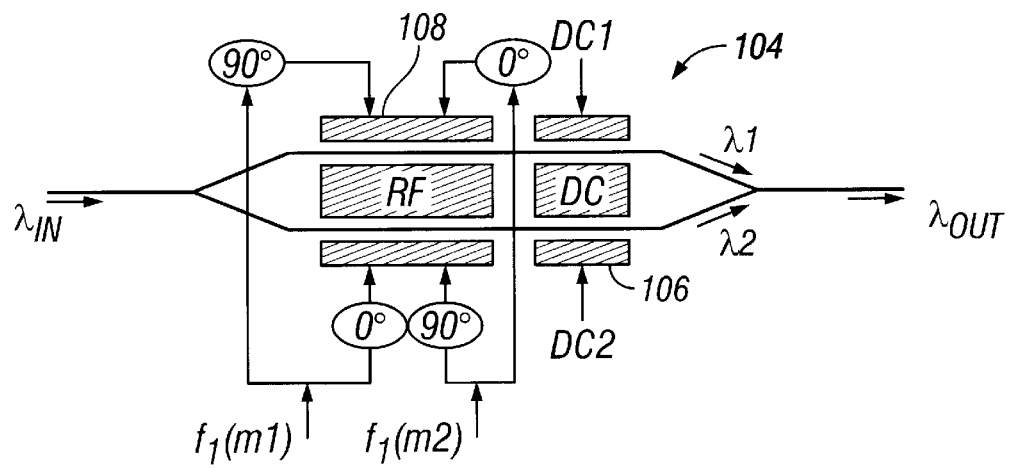
FIG. 5C is a schematic diagram of a dual-electrode Mach-Zehnder modulator as employed in the present invention.
Figure 5D:
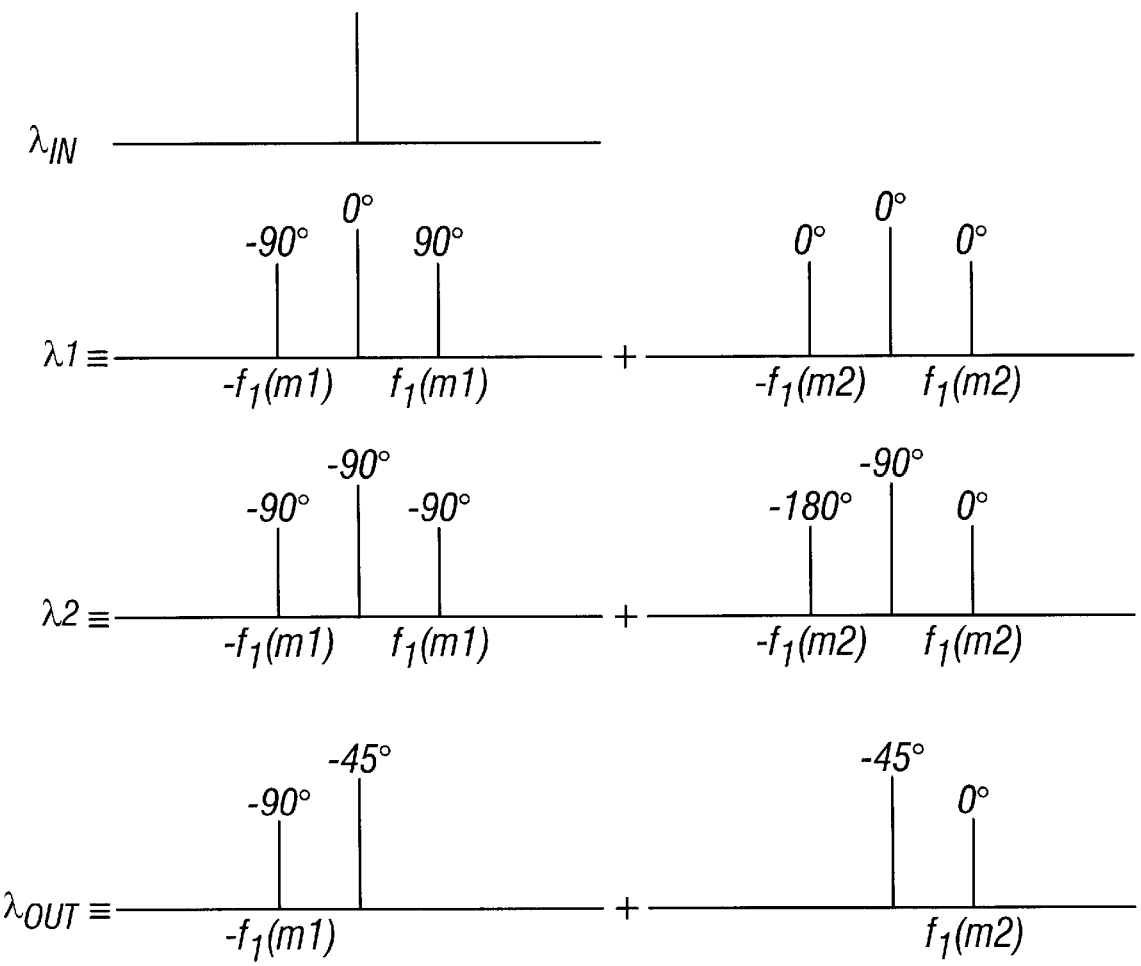
FIG. 5D is a spectral diagram showing input and output of the modulator shown in FIG. 5C.

FIGS. 5C and 5D illustrate D-OSSB transmission. Just as in OSSB, a dual-electrode Mach-Zehnder modulator 104 is used. An incoming light signal $\lambda_{IN}$ is split into a first optical signal $\lambda_1$ and a second optical signal $\lambda_2$. An RF alternating current electrode 106 is used to modulate the two optical signals with a first channel m1, to be transmitted, however, the signal is applied to the carrier in such a way that the m1 component of the first and second optical signals are phase-shifted 90° with respect to each other. At the same time, the RF alternating current modulates the two optical signals with a second signal m2, with the m2 component of the first and second optical signals phase-shifted 90° with respect to each other. Moreover, in each arm of the modulator, m1 is phase-shifted 90° with respect to m2. Subsequently, a DC electrode 209 further modulates the carriers such that the two arms are also shifted 90° with respect to each other, that is the carriers of the two arms are in quadrature with each other. The two signals are then combined to produce an output signal $\lambda_{OUT}$ in which contains the carrier, m2 as the upper side band and m1 as the lower side band.

As shown in FIG. 5D, $\lambda_{IN}$ includes only the carrier. After both the AC and DC electrodes have applied an electric field to the carrier signal in the upper arm, $\lambda_1$ can be represented by the sum of the two spectra shown. A first spectrum of $\lambda_1$ has an upper and a lower side band each carrying m1, the upper side band at 90° and the lower side band at −90°, along with the carrier at 0°. A second, carrying m2, has an upper side band at 0° and a lower side band also at 0°. Likewise, after passing through both electric fields, the lower arm signal $\lambda_2$ can be represented by the sum of two spectra. A first $\lambda_2$ spectrum carrying m1 has a carrier at −90°, an upper side band at −90° and a lower side band at −90°. A second, carrying m2, has a carrier at −90°, an upperside band at 0° and a lower side band at 180°. When the two signals $\lambda_1$ and $\lambda_2$ are combined to form $\lambda_{OUT}$ the two upper side bands of m1 cancel each other, leaving only the lower side band and the carrier. Similarly, the two lower m2 sidebands cancel each other, leaving only the upper side band and the carrier. Thus, $\lambda_{OUT}$ contains the carrier and the two side bands, the lower carrying m1 and the upper carrying m2. The system can be easily modified to reverse the order such that the lower side band will carry m2 and the upper will carry m1.

Figure 3A:
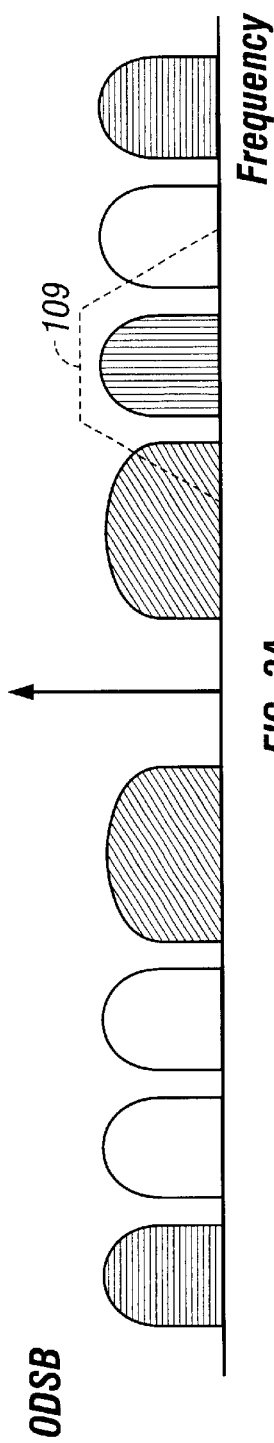
FIG. 3A is a spectral diagram showing optical double sideband transmission.
Figure 3B:
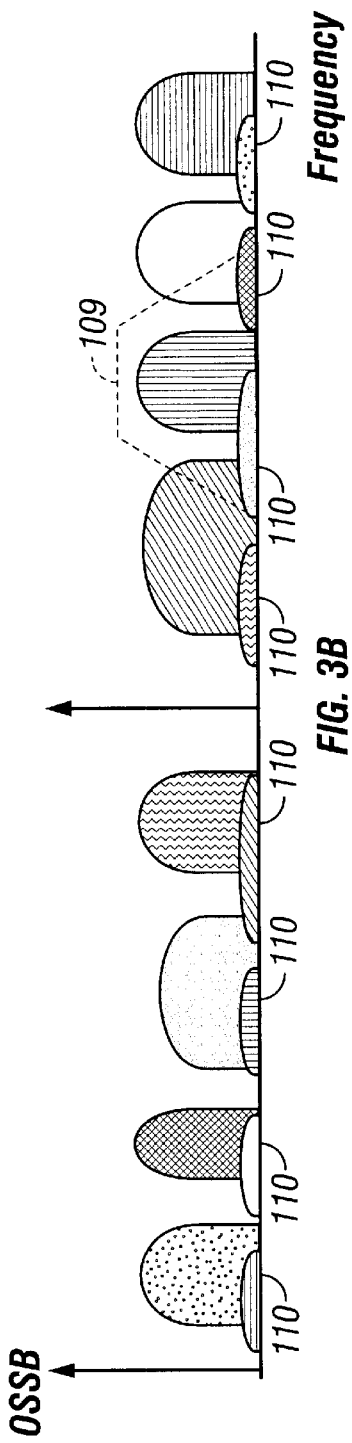
FIG. 3B is a spectral diagram showing optical single sideband transmission.

As discussed above, ODSB transmission has the drawback that an optical filter will have a spectrum 109 which tends to overlap multiple channels, introducing noise into the decoded signal, as shown in FIG. 3A. Further, ODSB requires allocating one-half of the bandwidth to images of the primary information since each side band carries the same information. As shown in FIG. 3B, the OSSB technique shown in FIGS. 5A–B fail to completely solve these problems. Though the lower side band is available for additional channels as in D-OSSB, the problem with the filter overlap remains, and a second problem is introduced. Since it is difficult to produce perfect quadrature in the multiplexer, cancellation of the unwanted side band will often be incomplete, resulting in residual images 110. These residual images 110 produce additional noise, which when added to the noise resulting from the filter's slow roll off, can seriously interfere with reception of the transmitted data.

Figure 3C:
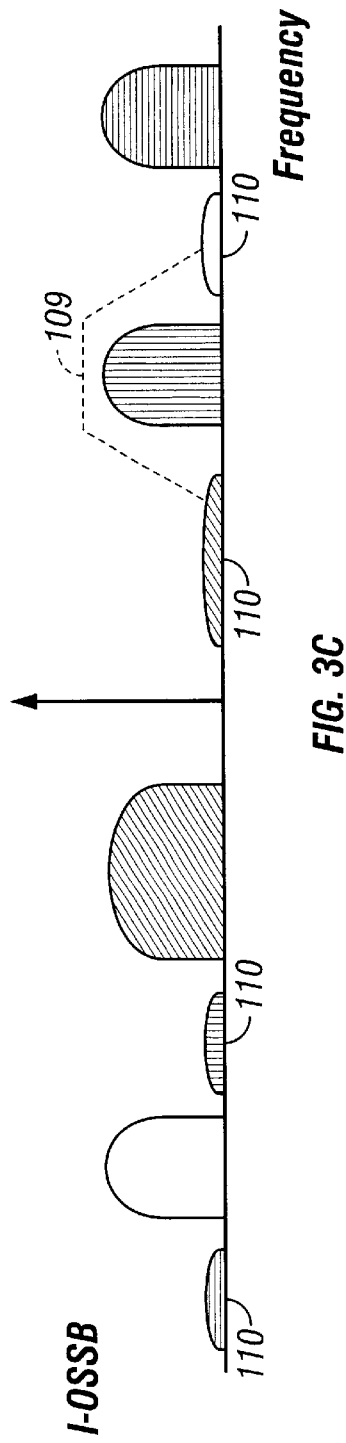
FIG. 3C is a spectral diagram showing interleaved optical single sideband transmission according to the present invention.

As shown in FIG. 3C, by interleaving channels with empty channels, the problem of slow band bass filter roll off can be eliminated and the problem of residual images can be substantially reduced. Since no channel is directly adjacent to another, the filter can properly capture a single channel without also picking up portions of the neighboring ones.

Since there are only two residual images 110 on each side band (in this example using four channels), the filter will pick up a smaller amount of noise from the images. Note how in FIG. 3C, only tails of each residual image are within the filter range 109. In contrast, in FIG. 3B, nearly two entire residual images are within the filter range 109.

Figure 6A:
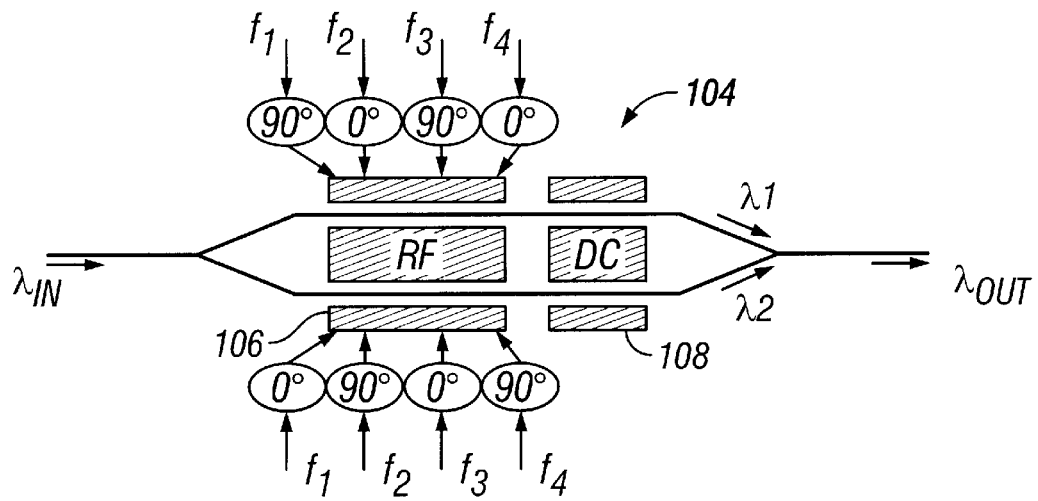
FIG. 6A shows four channel dual-electrode Mach-Zehnder modulator as employed in the present invention.
Figure 6B:
FIGS. 6B–6E show spectral diagrams of input and output signals from the modulator shown in FIG. 6A.
Figure 6C:
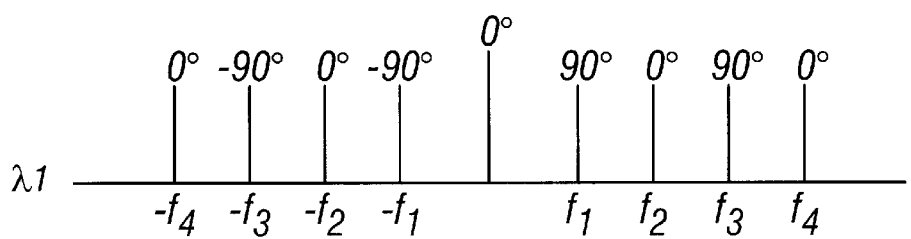

A modulator consistent with the present invention for interleaving channels to produce I-OSSB modulation is illustrated in FIGS. 6A–E. An input optical signal $\lambda_{IN}$, includes only the carrier as shown in FIG. 6B. The AC electrode 106 of a Mach-Zehnder multiplexer 104 applies an electric field to the carrier signal in the upper arm, $\lambda_1$ containing the channels to be transmitted. After further application of a DC field by the DC electrode 108, the output can be represented by the spectrum shown in FIG. 6C. Four separate signals $f_1$, $f_2$, $f_3$, and $f_4$ are multiplexed onto the carrier, each producing both an upper side band and a lower side band. Adjacent channels are 90° out of phase with each other.

Figure 6D:
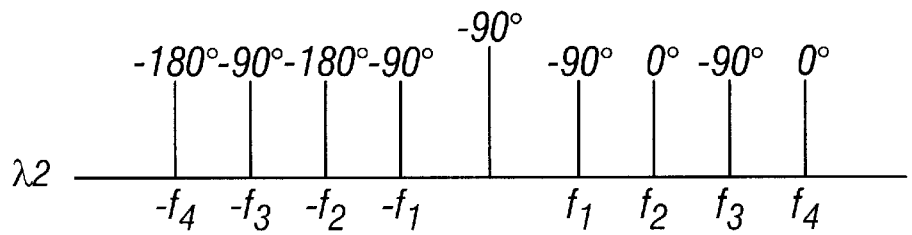
Figure 6E:
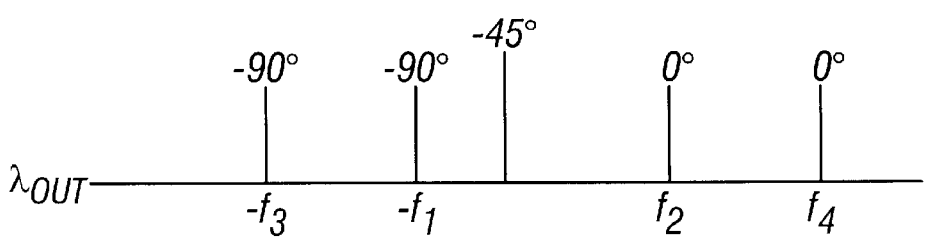

Similarly, the lower arm has four separate signals $f_1$, $f_2$, $f_3$, and $f_4$ multiplexed onto the carrier, as shown in FIG. 6D. Each of the signals, $f_1$, $f_2$, $f_3$, and $f_4$, is applied to the lower arm in quadrature with the corresponding signal $f_1$, $f_2$, $f_3$, and $f_4$ in the upper arm and each is 90° out of phase with its adjacent channel. Each arm is then placed in quadrature with the other by the DC electrode 108.

When the two signals $\lambda_1$ and $\lambda_2$ are combined to form $\lambda_{OUT}$ the $f_1$ and $f_3$ signals are cancelled in the upper side band, leaving only $f_2$ and $f_4$. Likewise, in the lower side band, $f_2$ and $f_4$ signals are cancelled leaving only $f_1$ and $f_3$. Thus, $\lambda_{OUT}$ contains the carrier and the two side bands, the lower side band carrying $f_1$ and $f_3$ and the upper side band carrying $f_2$ and $f_4$. The system can be easily modified to reverse the order such that the lower side band will carry $f_2$ and $f_4$ and the upper will carry $f_1$ and $f_3$. As can be appreciated from the spectrum shown in FIG. 6E, this result corresponds to the spectrum shown in FIG. 3C and each channel has no directly adjacent channels, that is, every other channel has been cancelled.

Figure 7:
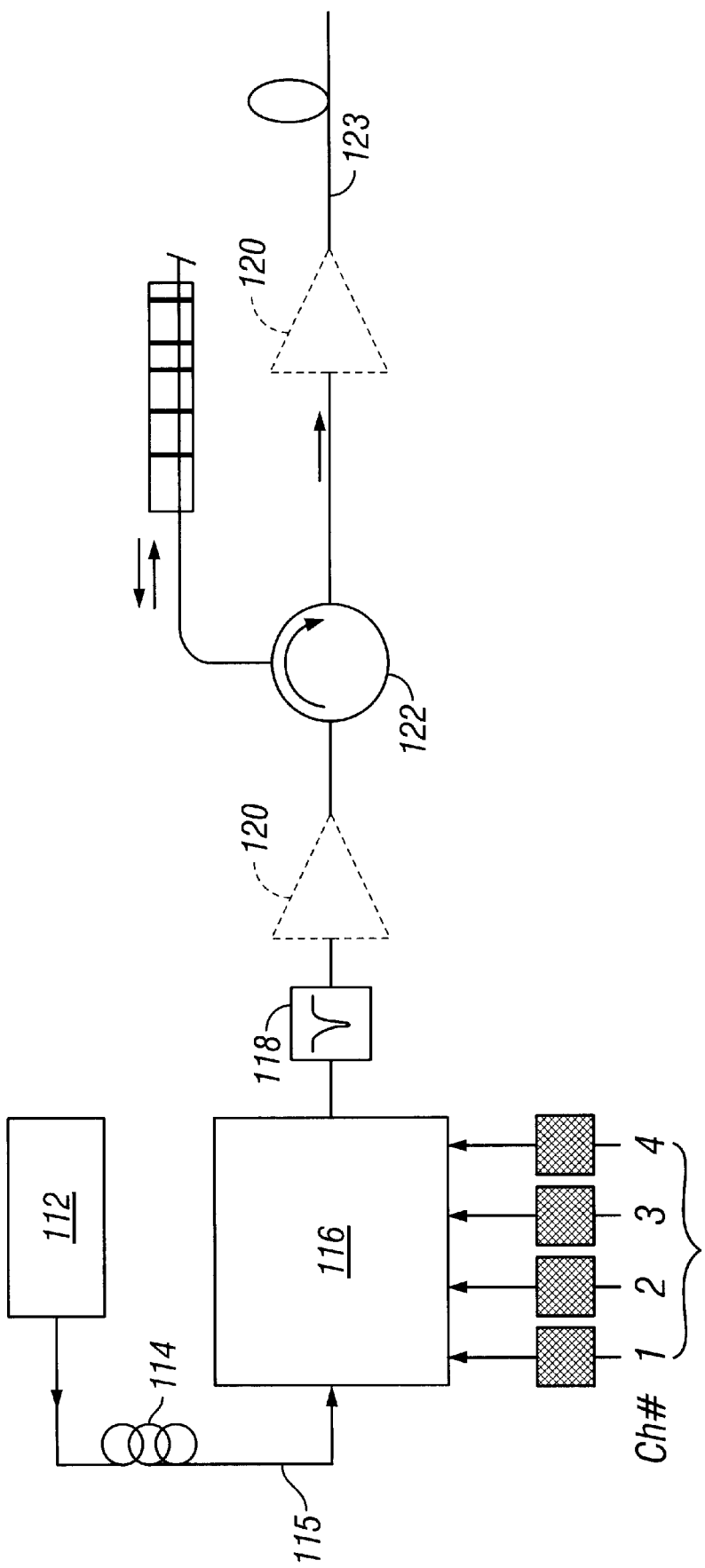
FIG. 7 is a schematic diagram showing an interleaved optical single sideband suppressed carrier optical transmitter according to the present invention.

The I-OSSB modulator of FIGS. 6A–E may be used in a transmission system as illustrated in FIG. 7. A continuous wave light source 112, such as a laser diode, produces a light signal. The light si passes through a polarization controller 114 and a polarization maintaining optical fiber 115 which maintains a particular polarization of the light. The light signal is processed by an I-OSSB optical modulator 116 as described above, producing, in the example as shown, four multiplexed channels. A notch filter 118 is disposed downstream from the modulator 116. The notch filter 118 is a bandreject filter which is selected to eliminate the carrier without interfering with the signals of the channels. Optionally, an EDFA amplifier 120 may follow the notch filter 118 to boost the signal strength. Preferably, the system includes a dispersion compensating device 122 which helps to reduce the signal loss due to dispersion and intermodulation (i.e. four wave mixing). This dispersion compensating device 122 may be, for example, a chirped fiber Bragg grating (CFBG), as shown in the FIG., in which the period of the grating varies linearly with position. As a result, the grating reflects different wavelengths at different points along its length which produces a wavelength dependent delay in the signal. In a wide band application, it may be necessary to employ multiple CFBGs in order to produce sufficient delay across a broad frequency range. Alternately, a dispersion compensating fiber may be used, however, dispersion compensating fibers generally have the drawback that attenuation is very high. After passing through the dispersion compensating component 122, the signal may be amplified again by an amplifier 120, then it is transmitted through the optical fiber 123, which is preferably single mode fiber.

Figure 8:
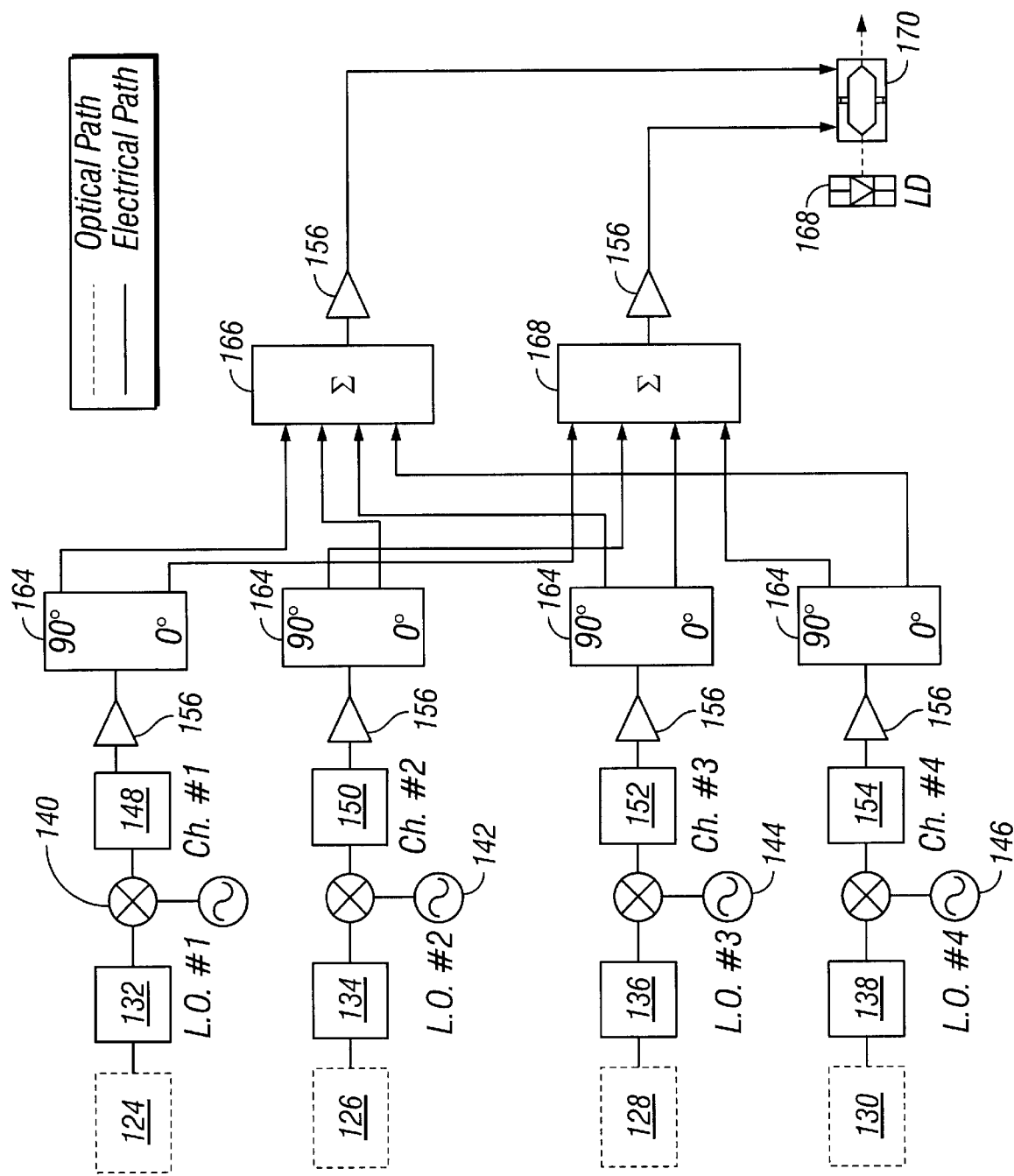
FIG. 8 is a schematic diagram of a transmitter according to the present invention.

FIG. 8 shows additional detail of the electrical portion of a transmitter according to the present invention. A plurality of modulators (for purposes of illustration, four) 124, 126, 128, 130 produce a signal for each of a plurality of channels. Each channel signal is preferably filtered with a low pass filter 132, 134, 136, 138 prior to upconversion by a local oscillator 140, 142, 144, 146. Next, the signals are preferably filtered again with a band pass filter 148, 150, 152, 154 prior to (optional) amplification by an amplifier 156. A hybrid coupler 164 is used to split each channel into two signals at 90° to each other. Two of the 90° signals are passed to a first summer 166 and two to a second summer 168. Likewise, two of the 0° are passed to each summer 166, 168. By way of example, the 90° of channels 1 and 3 are passed along with the 0° of channels 2 and 4 to the first summer 166, while the 90° of channels 2 and 4 are passed along with the 0° of channels 1 and 3 to the second summer 168. The summed signals may then be used to modulate a light signal from light emitting device 168 at the carrier frequency in a dual-arm Mach-Zehnder modulator 170 as shown in FIGS. 6A–E. The summers may also be replaced by wideband microwave/millimeter wave directional couplers to increase the number of combined channels.

Figure 9:
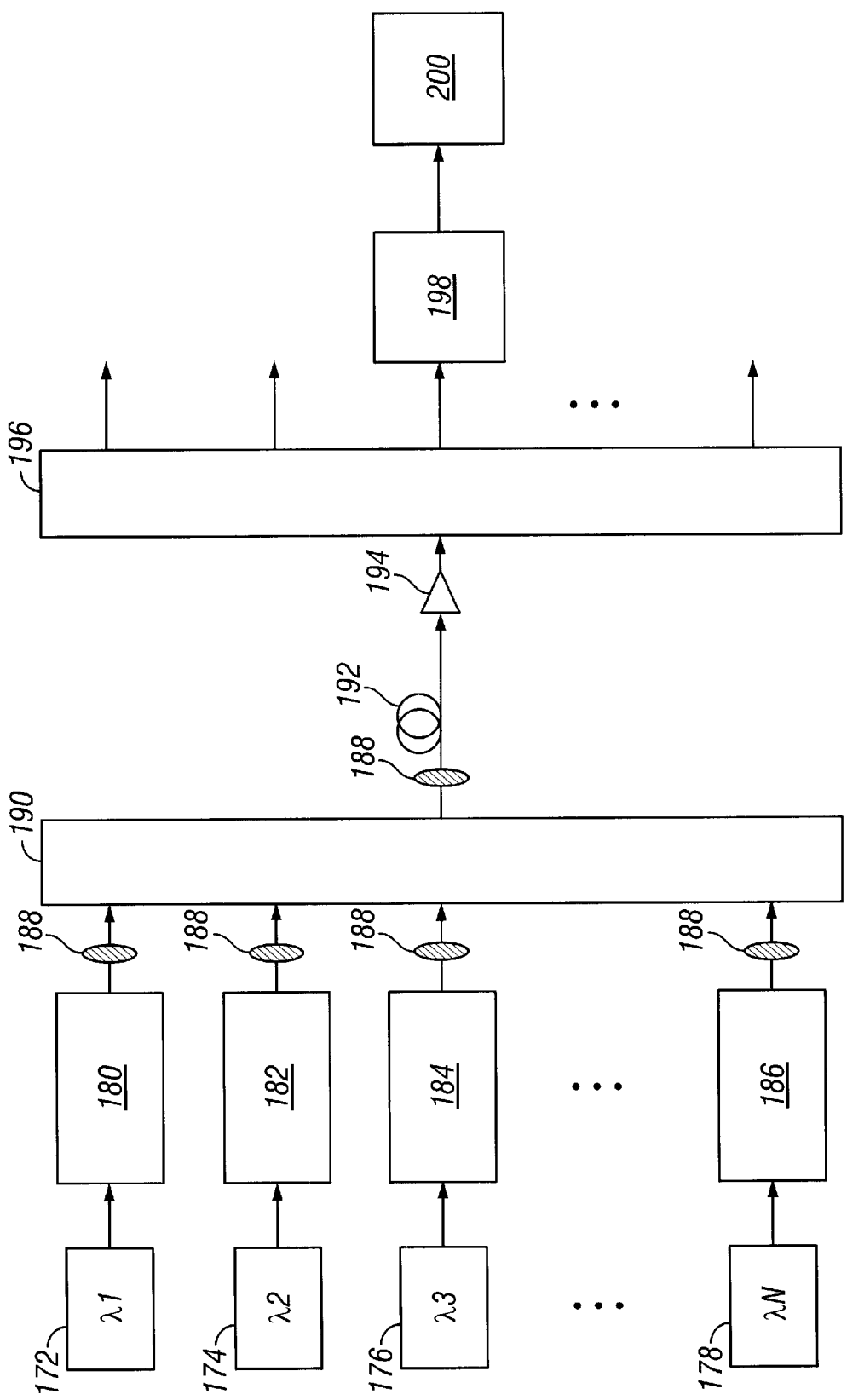
FIG. 9 is a schematic diagram of a multiple light source optical communication system according to the present invention.

It may be useful in practice to provide a system according to the present invention which combines the I-OSSB modulator with dense wavelength division multiplexing to provide extremely high bandwidth transmission, as shown in FIG. 9. A plurality of light emitting devices 172, 174, 176, 178 supply carrier signals for a plurality of I-OSSB modulators 180, 182, 184, 186, each transmitting multiple channels. The multiplexed signals are preferably passed through a dispersion compensating device 188 before or preferably after entering a multiplexer 190, which may be of conventional design. The multiplexer 190 can also be replaced by a wideband optical coupler whenever applicable. The multiplexed signal is transmitted over a single mode fiber 192 and treated, as appropriate, with an amplifier 194 such as an EDFA. A demultiplexer 196, which may be of conventional design, separates the carrier signals, which are then filtered by an optical filter 198 and received with a receiver 200 according to the present invention, such as is shown in FIG. 4B or 4C. In place of a conventional demultiplexer 196, the demultiplexer 196 may be custom designed to accommodate various wavelength windows.

While the invention has been described in connection with what is presently considered to be the most practical and preferred embodiment, it is to be understood that the invention is not limited to the disclosed embodiment, but on the contrary it is intended to cover various modifications and equivalent arrangement included within the spirit and scope of the claims which follow.

We claim:

1. An interleaved optical single sideband communications system comprising:
   a modulator, constructed and arranged to accept an incoming optical carrier, the modulator comprising:
   a splitter which splits the incoming optical signal into a first optical carrier and a second optical carrier;
   a first AC phase modulator to apply a first electrical signal carrying a plurality of first channels to modulate the first optical signal;
   a second AC phase modulator to apply a second electrical signal carrying a plurality of second channels to modulate the second optical signal, each first channel corresponding to one of the second channels, and each first channel being phase shifted 90° relative to each corresponding second channel;

a first DC phase modulator to modulate the first optical signal;

a second DC phase modulator to modulate the second optical signal, the first and second DC phase modulators constructed and arranged to modulate an optical carrier component of the first optical signal to be phase shifted 90° relative to an optical carrier component of the second optical signal, the optical carrier component of the second optical signal having a frequency substantially equal to the optical carrier component of the first optical signal; and a combiner which combines the modulated first and second optical signals to form a combined optical signal having an optical carrier component, such that alternate channels of the combined optical signal are substantially cancelled.

2. An interleaved optical single sideband communications system according to claim 1, further comprising:

an input polarization controller, constructed and arranged to control a polarization of the incoming optical signal;

a polarization maintaining input optical fiber, constructed and arranged to accept the incoming optical signal from the input polarization controller and to provide the incoming optical signal to the modulator.

3. An interleaved optical single sideband communications system according to claim 1, further comprising:

a light emitting device, constructed and arranged to produce the incoming optical carrier and inject the incoming optical carrier into the modulator;

a notch filter, disposed after the modulator, the notch filter filtering a range of wavelengths including a wavelength of the optical carrier component of the combined optical signal;

a dispersion compensation device, disposed after the notch filter.

4. An interleaved optical single sideband communications system according to claim 3, wherein an amplifier is disposed after the fiber dispersion compensation device.

5. An interleaved optical single sideband communications system according to claim 4, wherein the amplifier is a erbium doped fiber amplifier.

6. An interleaved optical single sideband communications system according to claim 3, wherein the dispersion compensation device is a device selected from the group consisting of: a length of dispersion compensating fiber and a chirped fiber Bragg grating.

7. An interleaved optical single sideband communications system according to claim 1, further comprising an optical receiver receiving the combined optical signal, the optical receiver comprising:

an optical filter, constructed and arranged to pass a range of frequencies corresponding to a selected channel of the combined optical signal; and a baseband optical receiver, receiving the selected channel.

8. An interleaved optical single sideband communications system according to claim 7, wherein the optical filter further comprises a tunable narrowband optical filter, tunable among a plurality of ranges of frequencies corresponding to channels carried in the combined optical signal.

9. An interleaved optical single sideband communications system according to claim 8, wherein the tunable narrowband optical filter further comprises a feedback circuit such that the filter passband can be locked on to a center of a channel to be passed through the filter.

10. An interleaved optical single sideband communications system according to claim 7, wherein the optical filter further comprises a plurality of fixed narrowband optical filters, each corresponding to a range of frequencies corresponding to a single channel carried in the combined optical signal, and the baseband optical receiver further comprises a plurality of baseband optical receivers each of which is disposed after a corresponding one of the fixed narrowband optical filters to receive a single channel therefrom.

11. An interleaved optical single sideband communications system according to claim 1, further comprising:

a wideband optical receiver; and a plurality of demodulators, each demodulator constructed and arranged to extract a range of frequencies from the combined optical signal corresponding to a single channel.

12. An interleaved optical single sideband communications system according to claim 1, further comprising:

a plurality of directional couplers disposed in series before the modulator, the directional couplers combining a plurality of channels to produce a combined electrical signal from which the first and second electrical signals are derived.

13. A method of transmitting a plurality of channels, comprising:

providing a plurality of electrical signals, each electrical signal corresponding to a channel;

producing a first and a second split signal corresponding to each of the plurality of signals, each first split signal being substantially at quadrature with a corresponding second split signal;

providing an optical carrier signal;

multiplexing the optical carrier signal with the split signals to produce a multiplexed optical signal such that alternate channels are substantially cancelled and residual images of upper side band channels do not substantially overlap channels carried on a lower side band.

14. A method according to claim 13, further comprising filtering the multiplexed optical signal to remove the optical carrier signal.

15. A method according to claim 13, wherein the multiplexed optical signal is further combined with at least one additional multiplexed optical signal by dense wavelength division multiplexing.

* * * * *